(12) United States Patent
Castillo (10) Patent No.: US 9,632,295 B2
(45) Date of Patent: Apr. 25, 2017

(54) FLOOD OPTIC

(71) Applicant: CREE, INC., Durham, NC (US)

(72) Inventor: Mario A. Castillo, New Braunfels, TX (US)

(73) Assignee: Cree, Inc., Durham, NC (US)

( * ) Notice: Subject to any disclaimer, the term of this patent is extended or adjusted under 35 U.S.C. 154(b) by 44 days.

(21) Appl. No.: 14/462,322

(22) Filed: Aug. 18, 2014

(65) Prior Publication Data

US 2015/0345747 A1 Dec. 3, 2015

Related U.S. Application Data

(60) Provisional application No. 62/005,955, filed on May 30, 2014, provisional application No. 62/009,039, filed on Jun. 6, 2014.

(51) Int. Cl.

| F21V 13/04 | (2006.01) |
|---|---|
| F21V 99/00 | (2006.01) |
| G02B 19/00 | (2006.01) |
| F21V 5/04 | (2006.01) |
| F21V 7/00 | (2006.01) |
| F21Y 101/00 | (2016.01) |

(52) U.S. Cl.
CPC ..... *G02B 19/0061* (2013.01); *G02B 19/0028* (2013.01); *F21V 5/04* (2013.01); *F21V 7/0091* (2013.01); *F21Y 2101/00* (2013.01)

(58) Field of Classification Search
CPC ................................... G02B 3/00; F21V 5/04
See application file for complete search history.

(56) References Cited

U.S. PATENT DOCUMENTS

| 5,398,179 | A | 3/1995 | Pacheco |
| 5,537,304 | A | 7/1996 | Klaus |
| 5,613,770 | A | 3/1997 | Chin, Jr. et al. |
| 5,685,634 | A | 11/1997 | Mulligan |
| 5,719,649 | A | 2/1998 | Shono et al. |
| 5,806,955 | A | 9/1998 | Parkyn, Jr. et al. |
| 6,257,737 | B1 | 7/2001 | Marshall et al. |
| 6,554,451 | B1 | 4/2003 | Keuper |
| 7,090,370 | B2 | 8/2006 | Clark et al. |
| 7,393,124 | B1 | 7/2008 | Williams |
| 7,534,013 | B1 | 5/2009 | Simon |
| 7,587,117 | B2 | 9/2009 | Winston et al. |
| 7,628,508 | B2 | 12/2009 | Kita et al. |

(Continued)

FOREIGN PATENT DOCUMENTS

EP 2354640 8/2011

OTHER PUBLICATIONS

International Search Report and Written Opinion for International Application No. PCT/US15/32011, Applicant, Cree, Inc., dated Oct. 23, 2015 (13 pages).

(Continued)

*Primary Examiner* — Joseph L Williams
(74) *Attorney, Agent, or Firm* — McCracken & Gillen LLC (57) ABSTRACT

An optical member includes a refractive portion adapted to refract light, a first total internal reflection surface adjacent to and disposed about at least a portion of the refractive portion, and a second total internal reflection surface displaced from the first total internal reflection surface distal to the refractive portion and disposed about at least a portion of the first total internal reflection surface.

20 Claims, 11 Drawing Sheets

(56) References Cited

U.S. PATENT DOCUMENTS

| | | |
|---|---|---|
| 7,736,019 B2 | 6/2010 | Shimada et al. |
| 7,810,960 B1 | 10/2010 | Soderman et al. |
| 7,914,193 B2 | 3/2011 | Peifer et al. |
| 7,967,477 B2 | 6/2011 | Bloemen et al. |
| 8,068,288 B1* | 11/2011 | Pitou .................. G02B 3/08 |
| | | 359/743 |
| 8,087,807 B2 | 1/2012 | Liu et al. |
| 8,096,671 B1 | 1/2012 | Cronk et al. |
| 8,096,681 B2 | 1/2012 | Fang et al. |
| 8,272,756 B1 | 9/2012 | Patrick |
| 8,277,106 B2 | 10/2012 | Van Gorkom et al. |
| 8,287,152 B2 | 10/2012 | Gill |
| 8,317,366 B2 | 11/2012 | Dalton et al. |
| 8,434,892 B2 | 5/2013 | Zwak et al. |
| 8,434,893 B2 | 5/2013 | Boyer et al. |
| 8,449,128 B2 | 5/2013 | Ko et al. |
| 8,449,142 B1 | 5/2013 | Martin et al. |
| 8,469,559 B2 | 6/2013 | Williams |
| 8,475,010 B2 | 7/2013 | Vissenberg et al. |
| 8,485,684 B2 | 7/2013 | Lou et al. |
| 8,547,022 B2 | 10/2013 | Summerford et al. |
| 8,567,983 B2 | 10/2013 | Boyer et al. |
| 8,573,823 B2 | 11/2013 | Dau et al. |
| 8,585,253 B2 | 11/2013 | Duong et al. |
| 8,593,070 B2 | 11/2013 | Wang et al. |
| 8,608,351 B2 | 12/2013 | Peifer |
| 2004/0146241 A1 | 7/2004 | Deladurantaye et al. |
| 2010/0195335 A1* | 8/2010 | Allen .................. F21K 9/135 |
| | | 362/309 |
| 2010/0202142 A1 | 8/2010 | Morgan |
| 2010/0302783 A1 | 12/2010 | Shastry et al. |
| 2010/0315833 A1 | 12/2010 | Holman et al. |
| 2011/0187273 A1 | 8/2011 | Summerford et al. |
| 2011/0233568 A1 | 9/2011 | An et al. |
| 2012/0019942 A1 | 1/2012 | Morgan |
| 2012/0026728 A1 | 2/2012 | Lou et al. |
| 2012/0152490 A1 | 6/2012 | Wen et al. |
| 2013/0088890 A1 | 4/2013 | Knapp et al. |
| 2013/0107528 A1 | 5/2013 | Boyer et al. |
| 2013/0201715 A1 | 8/2013 | Dau et al. |
| 2013/0215612 A1 | 8/2013 | Garcia |
| 2013/0229804 A1 | 9/2013 | Holder et al. |
| 2013/0294063 A1 | 11/2013 | Lou et al. |
| 2013/0343045 A1 | 12/2013 | Lodhie et al. |
| 2013/0343079 A1 | 12/2013 | Unger et al. |
| 2014/0036510 A1* | 2/2014 | Preston .................. F21V 7/0091 |
| | | 362/296.01 |

OTHER PUBLICATIONS

International Search Report and Written Opinion for International Application No. PCT/US15/32210, Applicant, Cree, Inc., dated Oct. 26, 2015 (19 pages).

* cited by examiner

FLOOD OPTIC

CROSS REFERENCE TO RELATED APPLICATIONS

The present application claims the benefit of U.S. Provisional Patent Application No. 62/005,955, filed May 30, 2014, entitled "Parking Structure LED Light" and U.S. Provisional Patent Application No. 62/009,039, filed Jun. 6, 2014, entitled "Parking Structure LED Light". This patent application incorporates by reference co-pending U.S. patent application Ser. No. 14/462,426, entitled "Outdoor and/or Enclosed Structure LED Luminaire for General Illumination Applications, Such as Parking Lots and Structures", filed Aug. 18, 2014, and U.S. patent application Ser. No. 14/462,391, entitled "Optic Components for Luminaire", filed Aug. 18, 2014, both owned by the assignee of the present application.

FIELD OF THE INVENTION

The present subject matter relates to general illumination lighting, and more particularly, to an optic used to collimate light rays generated by light emitting diodes.

BACKGROUND OF THE INVENTION

Light emitting diodes (LEDs) are assuming a more prominent role in the lighting industry. Improved consistency in the manufacture of LEDs along with improvements in the utilization of mounting structures to act as heat sinks have resulted in a light source that is economically competitive and operationally superior to the conventional incandescent and fluorescent lighting that has been the staple of the industry for several decades. As the use of LEDs has matured from their use in warning and other signals to general lighting fixtures, it has become necessary to develop optics that allow for the dispersion of the harsh, intensely concentrated beam of light emitted by the LED into a softer, more comfortable illumination that presents a uniform and even appearance.

One way of attaining a more uniform appearance is to control the light rays generated by the LEDs so as to collimate the light rays within an optic so that the light presents a uniform appearance when it exits the optic. This can be accomplished through the use of total internal reflection (TIR) in which light traveling through an optic is reflected back into the optic from a surface, provided that the incident light does not exceed a critical angle with respect to the surface. Specifically, the light rays continue to travel through the optic until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

Conventional lighting optics used with LEDs do not necessarily result in a uniform lighting appearance as one viewing the optic may see what appears to be numerous dots resulting from imaging of one or more LEDs of a multi-die LED package.

Some known optics use a single TIR wall. While this helps to collimate the light rays, a single wall is inherently limited in its ability to collimate light developed by the light source. The remainder of the light is refracted to obtain a desired degree of collimation, which results in a more uneven distribution of light that undesirably contributes to imaging of the LEDs.

SUMMARY OF THE INVENTION

Disclosed is an optical member. The optical member includes a refractive portion adapted to refract light, a first total internal reflection surface adjacent to and disposed about at least a portion of the refractive portion, and a second total internal reflection surface displaced from the first total internal reflection surface distal to the refractive portion and disposed about at least a portion of the first total internal reflection surface.

According to another aspect, an optic for transmitting light from a light source comprises a base, a light source adjacent to the base, and a refractive portion displaced a first distance from the base. A first total internal reflection surface is displaced from and angled away from the refractive portion and a second total internal reflection surface is adjacent to and angled away from the base.

Other aspects and advantages of the present invention will become apparent upon consideration of the following detailed description and the attached drawings wherein like numerals designate like structures throughout the specification.

DETAILED DESCRIPTION OF THE PREFERRED EMBODIMENTS

Disclosed in FIGS. 1-10 is an optical member 10 having a refractive portion 16 adapted to refract light, a first total internal reflection surface 18 adjacent to and disposed about at least a portion of the refractive portion 16, and a second total internal reflection surface 20 displaced from the first total internal reflection surface 18 distal to the refractive portion 16 and disposed about at least a portion of the first total internal reflection surface 18. In an embodiment, the second TIR surface 20 is a curved spline.

In an embodiment, the optical member 10 includes a base 14, a light source 12 (FIG. 10) adjacent to the base 14, and a light exit surface 22 located opposite the base 14. In a specific version of the embodiment, the light exit surface 22 is textured. In a particular version of the embodiment, the texture has a roughness depth of approximately 0.0004 inches. In an embodiment, the refractive portion 16 is a convex surface, as shown in FIGS. 1-3, 7 and 10. In yet another embodiment, the second TIR surface 20 is adjacent to and angled away from the base 14.

In an embodiment, the material(s) of the optical member 10 comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance.

Figure 10:
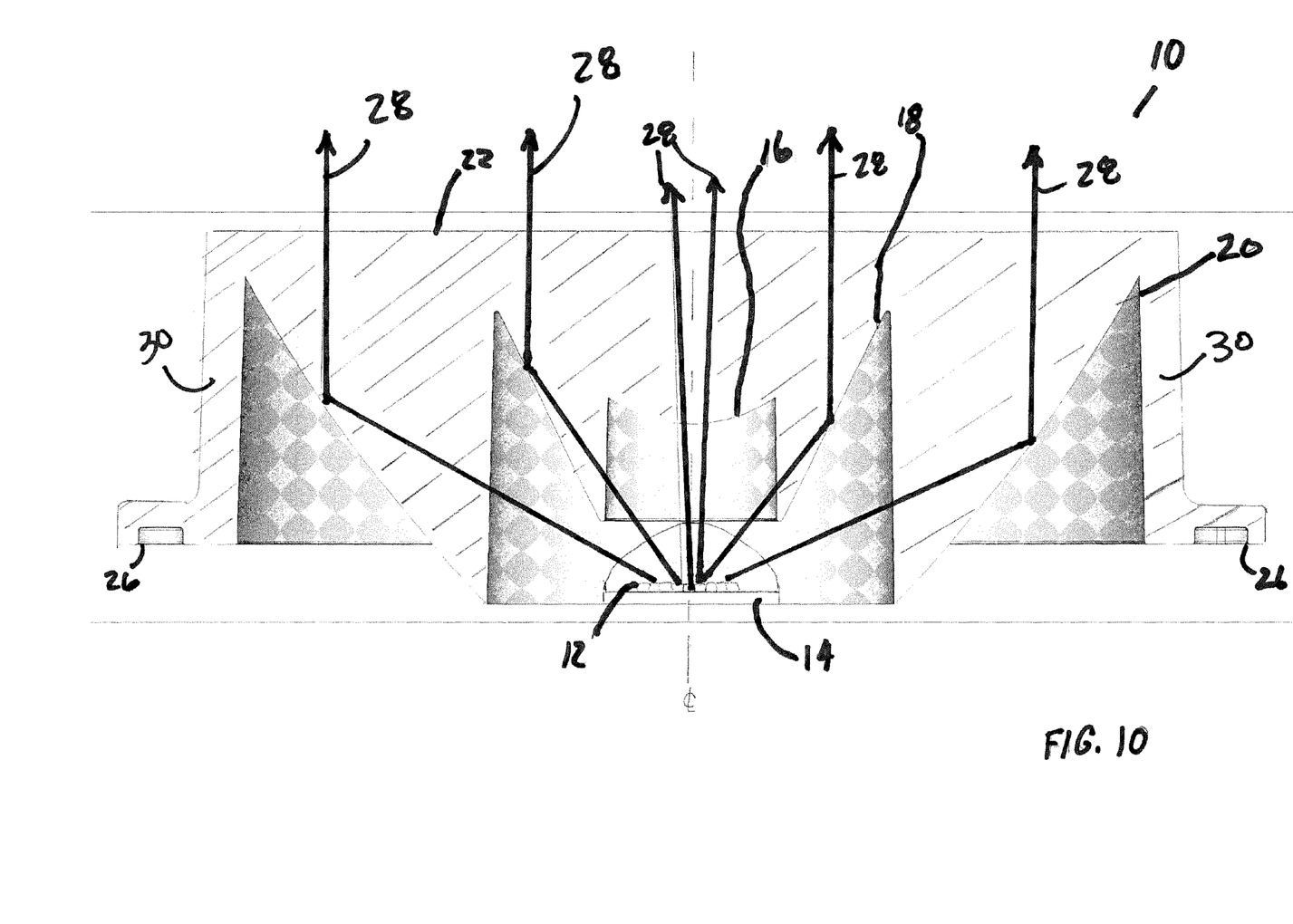
FIG. 10 is a cross sectional side view of an optic showing a light source and the direction of travel of light rays through the optic.

In an embodiment, the light source 12 is a light emitting diode (LED) element. In a specific version of the embodiment, the light source 12 is a multi-die LED package, as shown in FIG. 10. Each LED element or module may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module or a plurality of such elements or modules may include one or more blue shifted yellow LEDs and one or more red LEDs. The LEDs may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module may comprise one or more LEDs disposed within a coupling cavity with an air gap being disposed between the LED element or module and a light input surface. In any of the embodiments disclosed herein each of the LED element(s) or module(s) preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

In an embodiment, the second total internal reflection surface 20 terminates proximal to the light exit surface 22, as shown in FIGS. 1-3 and 10. In an embodiment, the optical member 10 further includes an outer surface 30 that circumscribes the second total internal reflection surface 20. In an embodiment, a flange 24 may extend from the outer surface 30 and define at least two mounting openings 26 that position and locate the optical member, as shown in FIGS. 5, 8, 9, and 10.

Figure 1:
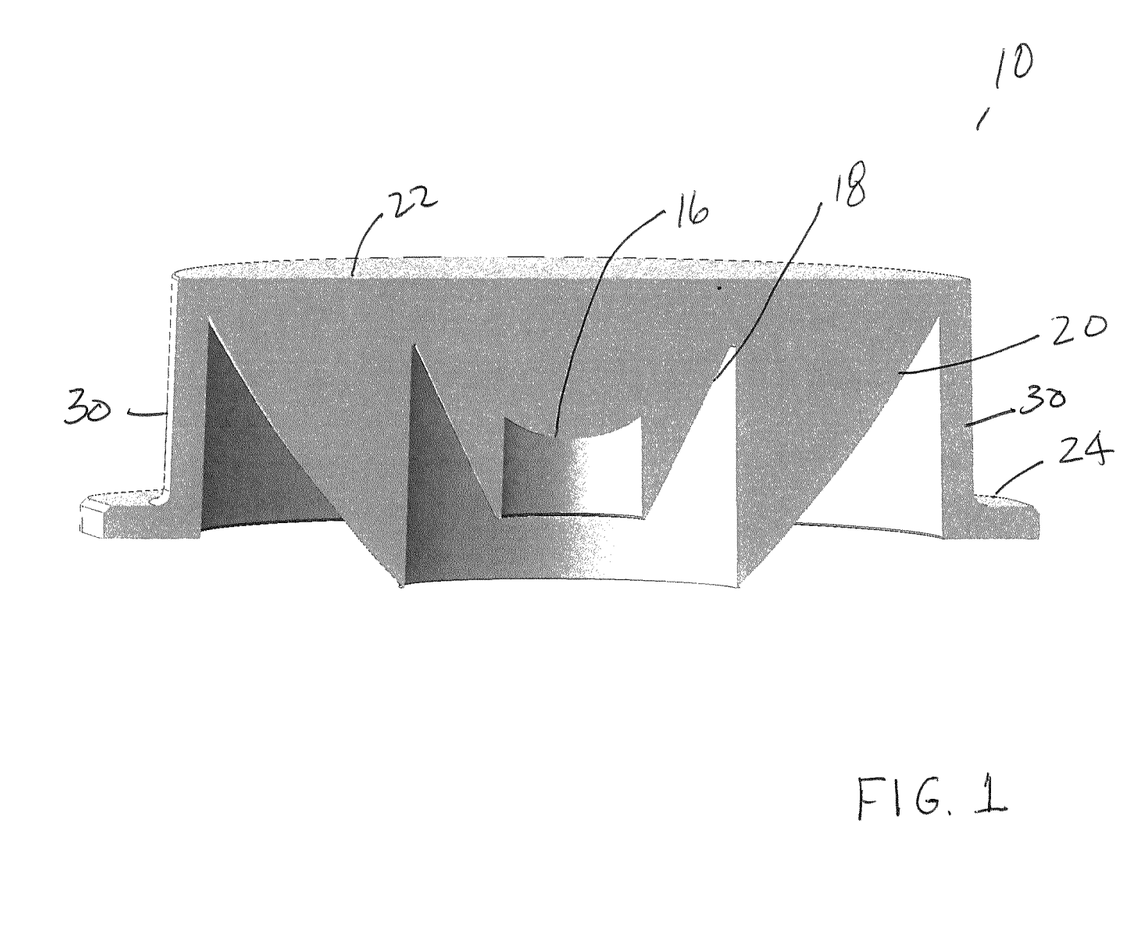
FIG. 1 is a cross sectional side view of an embodiment of an optic.
Figure 2:
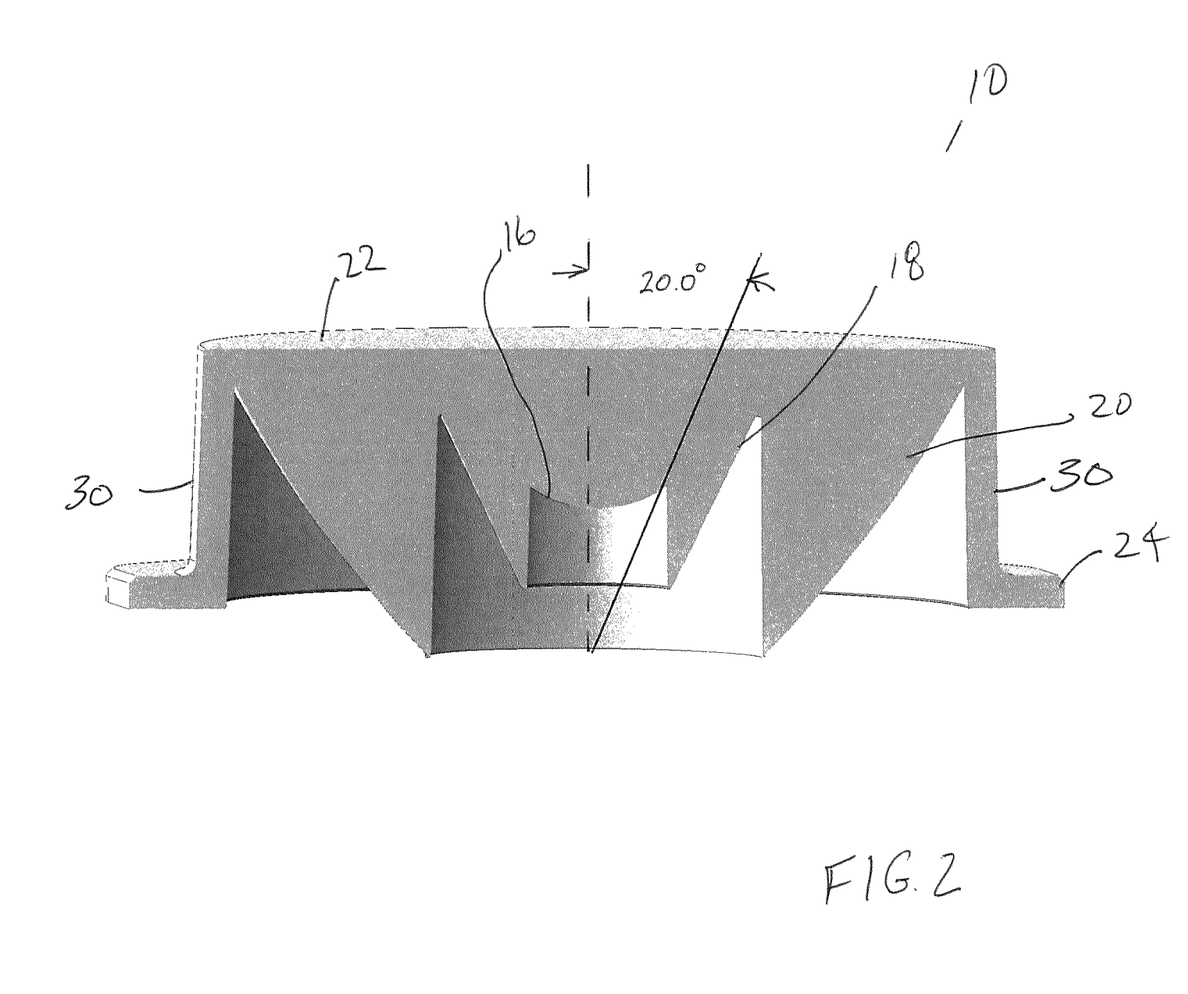
FIG. 2 is a cross sectional side view of the embodiment of the optic shown in FIG. 1 identifying a range of refractive collimation of light rays.
Figure 3:
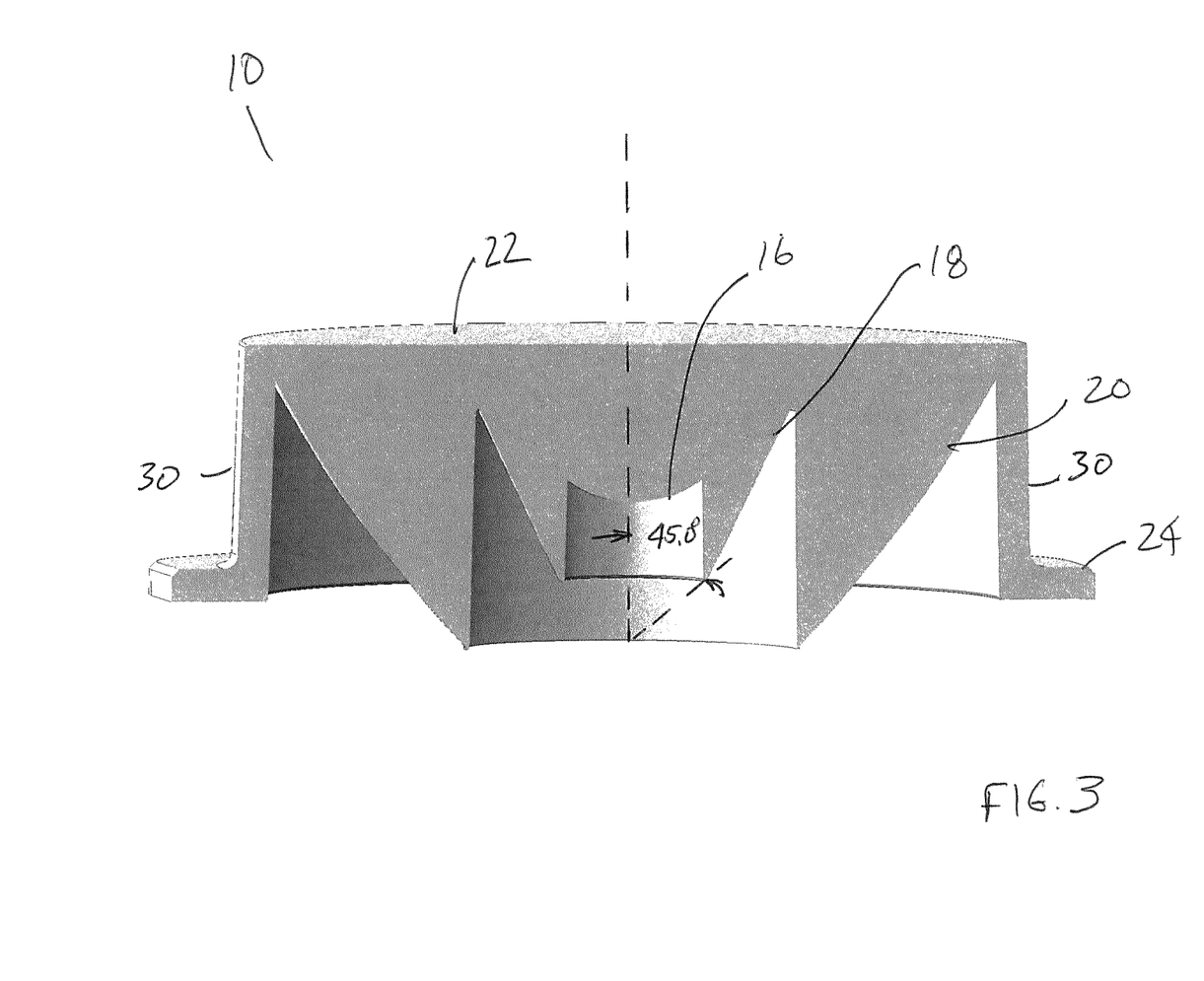
FIG. 3 is a cross sectional side view of the embodiment of the optic shown in FIG. 1 identifying the range of light rays collimated by first and second total internal reflection surfaces.
Figure 4:
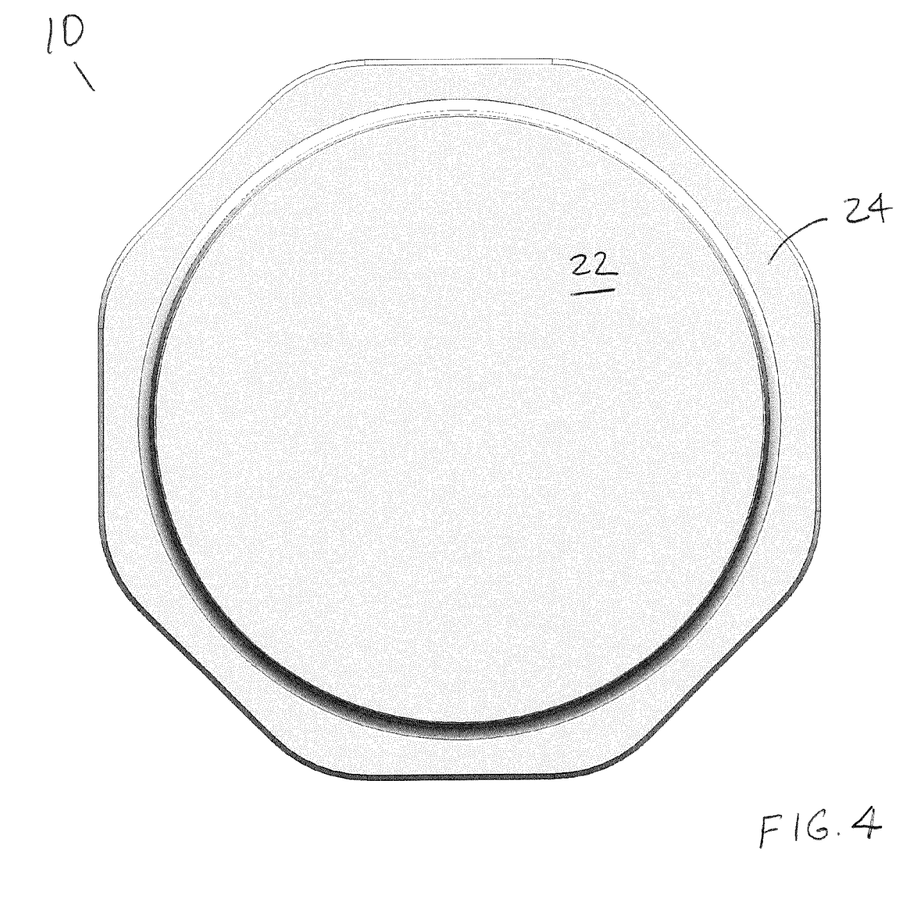
FIG. 4 is a plan view of the embodiment of the optic shown in FIG. 1.
Figure 5:
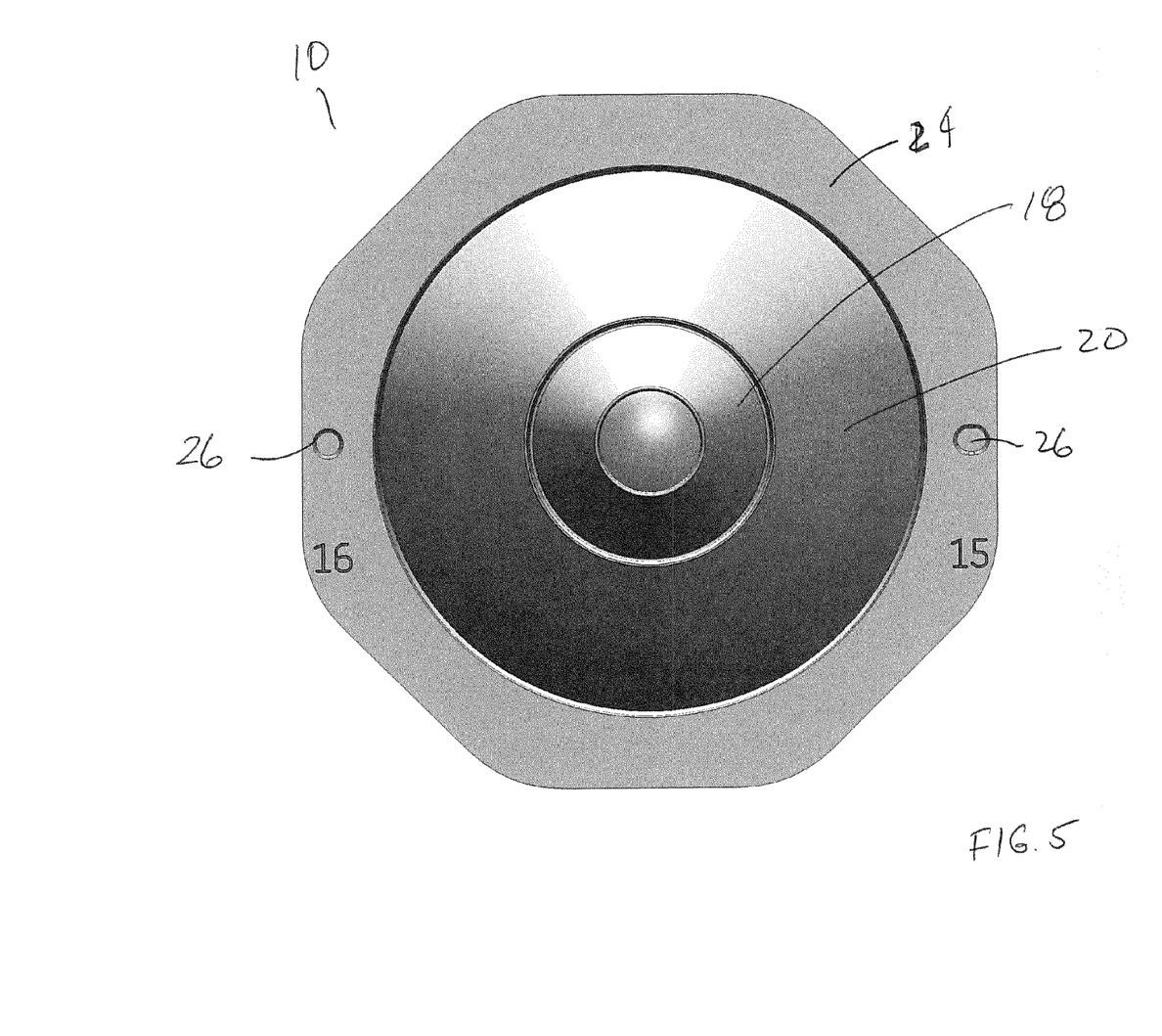
FIG. 5 is a bottom elevational view of the embodiment of the optic shown in FIG. 1.
Figure 6:
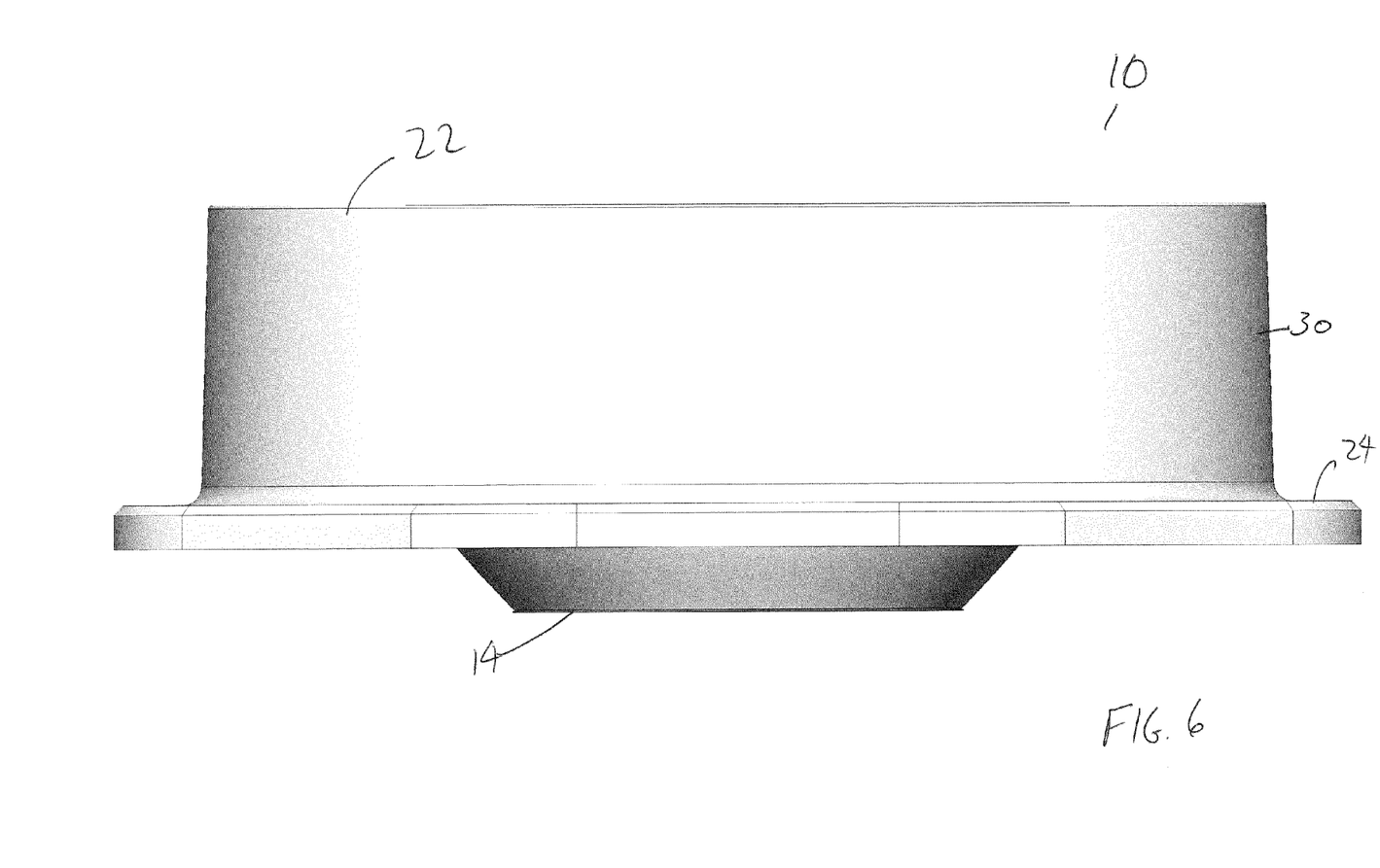
FIG. 6 is a side elevational view of the embodiment of the optic shown in FIG. 1.
Figure 7:
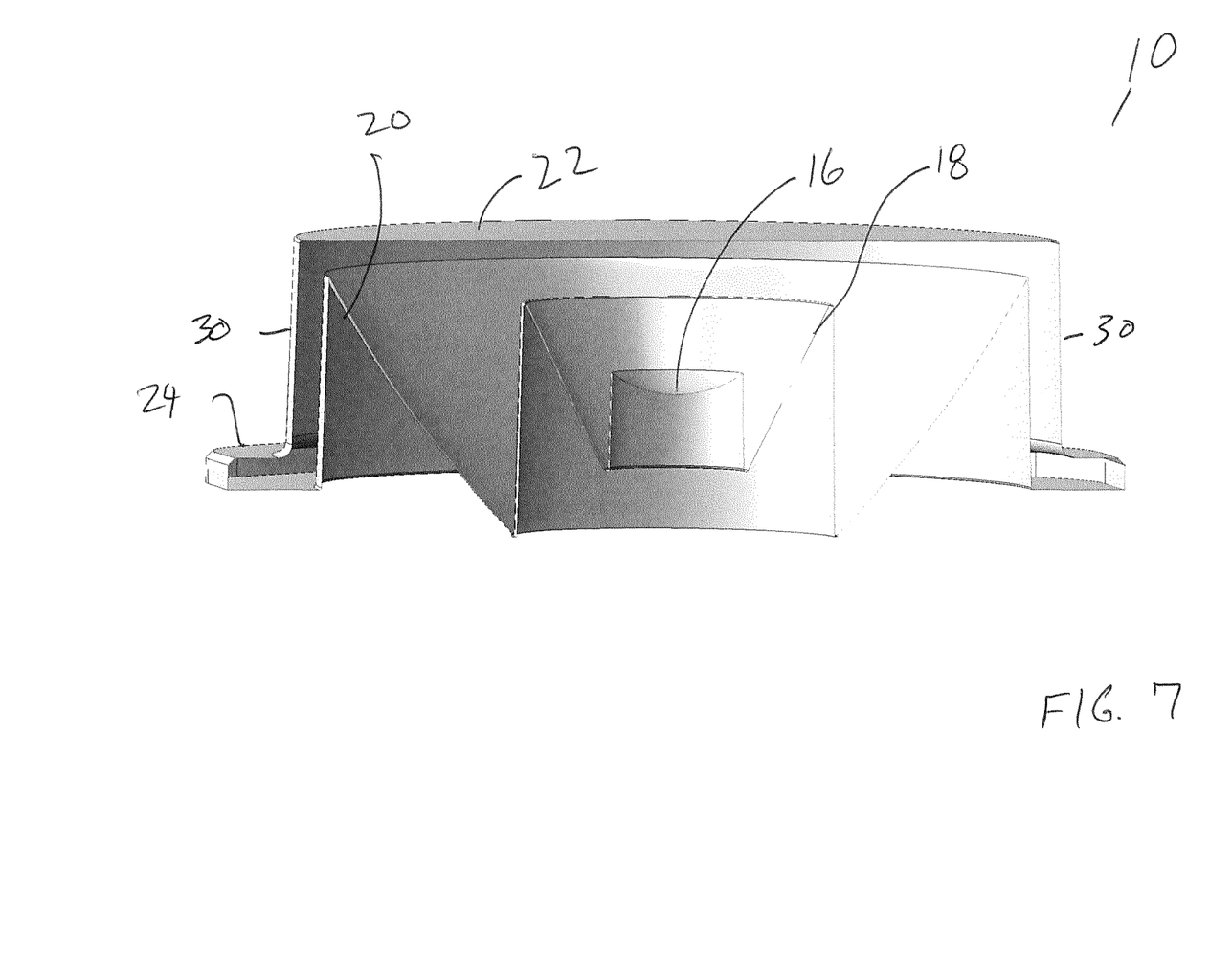
FIG. 7 is a transparent side elevational view of an embodiment of the optic shown in FIG. 1.
Figure 8:
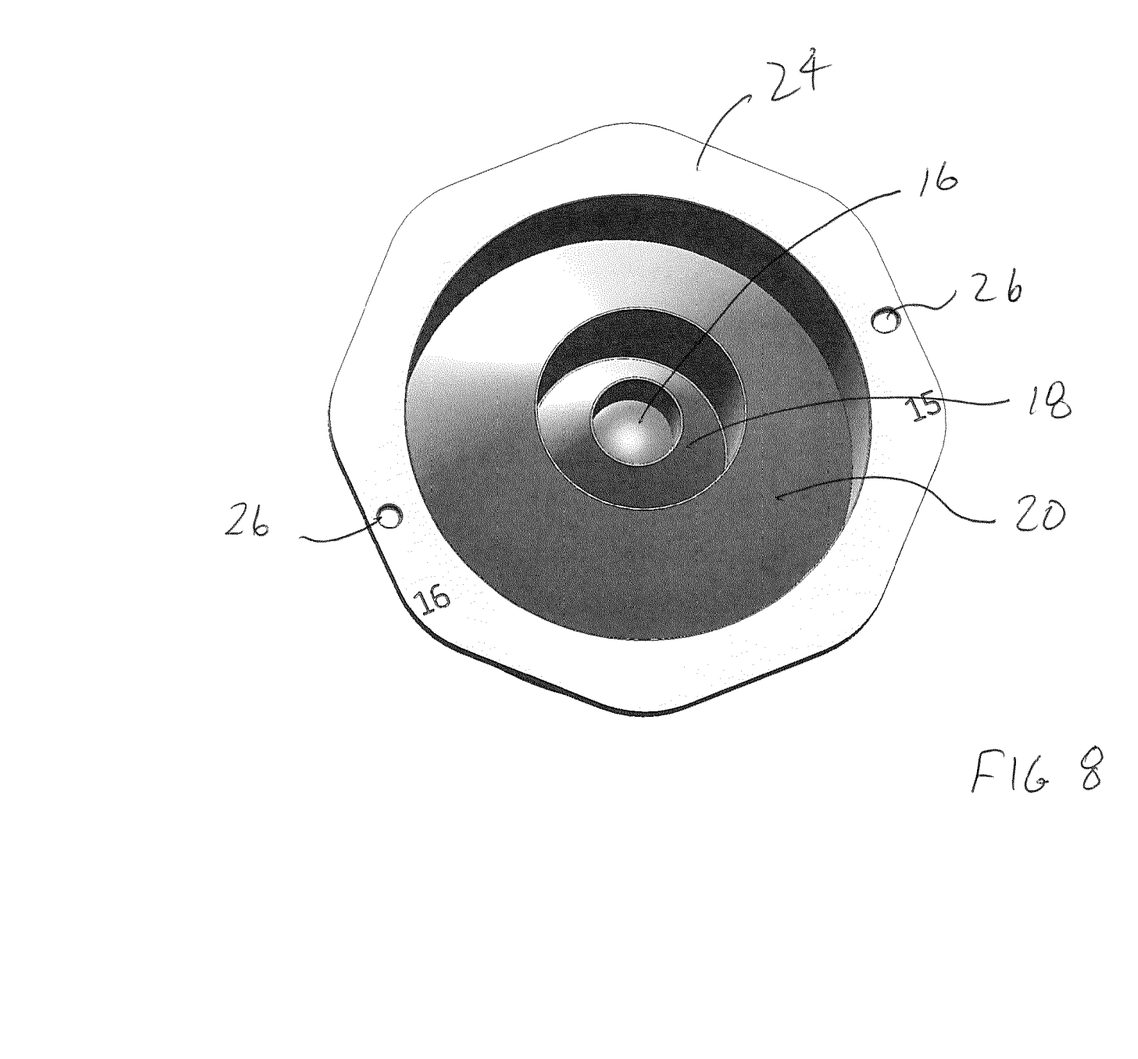
FIG. 8 is an isometric view of an embodiment of the optic shown in FIG. 1.
Figure 9:
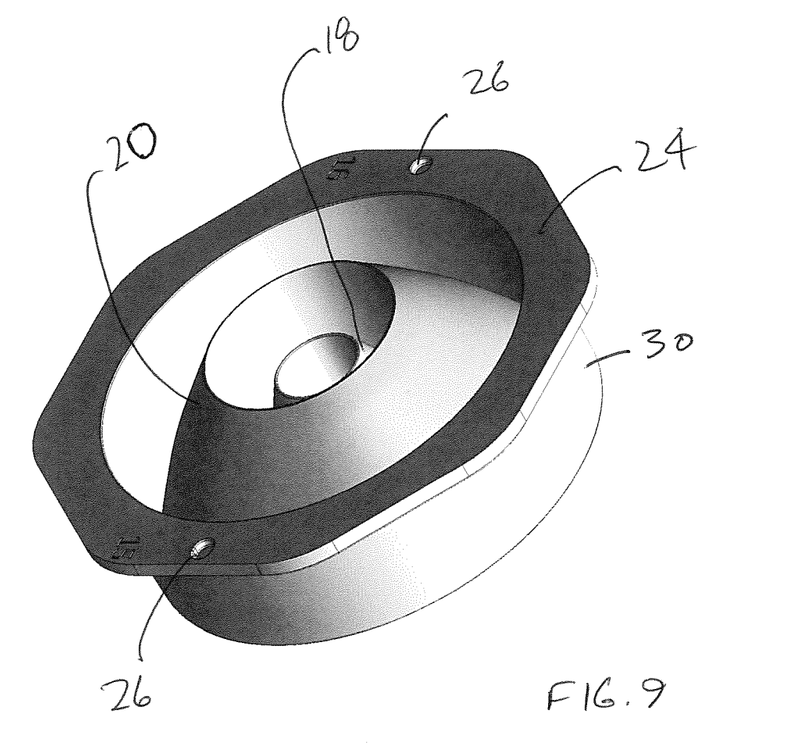
FIG. 9 is another isometric view of an embodiment of the optic shown in FIG. 1.

In the illustrated embodiment, the optical member 10 is circular in shape. In another embodiment, the optical member 10 has a different shape (such as elliptical, square, triangular, etc.) or the optical member 10 may have an elongate outer surface 30. In a still further embodiment, the optical member 10 may be elongate and have a constant cross sectional shape as shown in FIGS. 1-3 fully or partially along a length thereof. The optical member 10 may be straight (i.e., linear), piecewise linear, curved, or be of any other elongate shape.

When in operation, light rays 28 are emitted from the light source 12, as shown in FIG. 10. In the illustrated embodiment, the refractive portion 16 collimates light rays emitted from the light source within approximately ±20° from a central axis perpendicular to the base 14, as shown in FIGS. 2 and 10. At the same time, the first total internal reflection surface 18 collimates light rays emitted from the light source 12 between ±20° to ±45° of the central axis, as shown in FIGS. 3 and 10, while the second total internal reflection surface 20 collimates light rays emitted from the light source 12 between ±45° to ±90° of the central axis, as shown in FIG. 10. These light rays are collimated such that they pass through the light exit surface 22 within approximately ±7.5° of a line parallel to the central axis. Other embodiments may have different elements that collimate light emitted within other ranges and may collimate to a greater or lesser degree, as should be evident.

Figure 11:
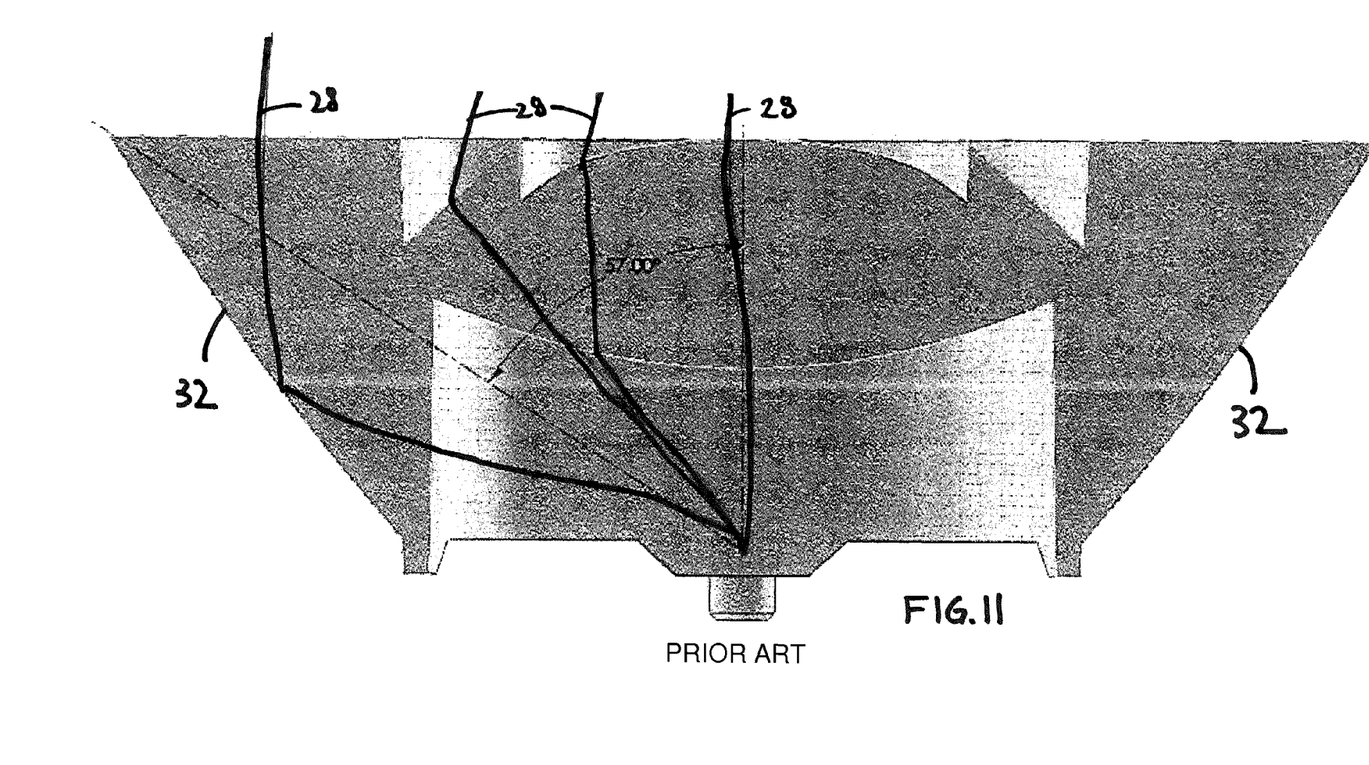
FIG. 11 is a transparent side elevational view of a known optic having a single total internal reflection surface.

Geometric features of an optical member 10 can image an LED die onto illuminated surfaces, thereby creating an undesirable visible effect on the surface. TIR elements 18, 20 and a textured finish on the exit surface 22 diminish projecting the die image on illuminated surfaces. A known optic, as shown in FIG. 11, uses a single TIR element 32. Light rays emitted within ±57° of the central axis are subject only to refraction. The remaining light, i.e., light rays greater than ±57° of the central axis, are subject to TIR. This results in 37% of the light rays being subject to TIR and 63% subject to refraction. Referring back the embodiment shown in FIGS. 1-3, the optic 10 collimates the light rays using the two TIR surfaces 18, 20, to produce a greater TIR content (e.g., 78% collimated by TIR compared to 22% collimated by refraction) thereby reducing the die imaging problem that is common on large multi-die LED packages, inasmuch as the optical member 10 provides a more uniform distribution of light. This uniform distribution is more pleasing and comfortable to a viewer or user of the optic.

The imaging problem is further reduced when the exit surface 22 is textured. This reduction in imaging permits collimation of the light rays to within ±7.5° of a line parallel to the central axis, or a total range of 15°.

Disclosed too is an optic 10 for transmitting light from a light source 12. The optic 10 is comprised of a base 14, a light source 12 adjacent to the base 14, a refractive portion 16 displaced a first distance from the base 14, a first total internal reflection surface 18 adjacent to and angled away from the refractive portion 16, and a second total internal reflection surface 20 adjacent to and angled away from the base 14. In an embodiment, the second TIR surface 20 of the optic 10 is a curved spline.

In an embodiment, a light exit surface 22 is located opposite the base 14. In a specific version of the embodiment, the light exit surface 22 is textured. In a particular version of the embodiment, the texture has a roughness depth of approximately 0.0004 inches. In an embodiment, the refractive portion 16 is a convex surface, as shown in FIGS. 1-3 and 7.

In an embodiment, the light source 12 is a light emitting diode (LED). In a specific version of the embodiment, the light source 12 is a multi-die LED package.

In an embodiment, the second total internal reflection surface 20 terminates proximal to the light exit surface 22. In an embodiment, the optical member 10 further includes an outer surface 30 that circumscribes the second total internal reflection surface 20. In an embodiment, a flange 24 may extend from the outer surface 30 and define at least two mounting openings 26, as shown in FIGS. 5, 8, 9, and 10. In another embodiment, the outer surface 30 may be elongate.

When in operation, light rays are emitted from the light source 12, as shown in FIG. 10. The refractive portion 16 collimates light rays emitted from the light source within approximately ±20° from a central axis perpendicular to the base 14, as shown in FIGS. 2 and 10. At the same time, the first total internal reflection surface 18 collimates light rays emitted from the light source 12 between ±20° to ±45° of the central axis, as shown in FIGS. 3 and 10, while the second total internal reflection surface 20 collimates light rays emitted from the light source 12 between ±45° to ±90° of the central axis, as shown in FIG. 10. These light rays are collimated such that they pass through the light exit surface 22 within approximately ±7.5° of a line parallel to the central axis.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

INDUSTRIAL APPLICABILITY

At least some of the optical members disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 8,000 lumens or greater, and, more preferably, a total luminaire output of at least about 3000 lumens, and most preferably a total lumen output of about 20,000 lumens. Further, the optical members disclosed herein may be used in luminaires preferably having a color temperature of between about 2500 degrees Kelvin and about 6200 degrees Kelvin, and more preferably between about 2500 degrees Kelvin and about 5000 degrees Kelvin, and most preferably about 2700 degrees Kelvin, although any color temperature may be used as desired. Also, at least some of the optical members disclosed herein may be used in luminaires preferably exhibiting an efficacy of at least about 75 lumens per watt, and more preferably at least about 90 lumens per watt, although the efficacy may be different depending on factors such as color temperature and applied voltage. Further, at least some of the optical members disclosed herein preferably exhibit an overall efficiency (i.e., light extracted out of the optical member divided by light injected into the optical member) of at least about 85 percent, preferably of at least 90 percent. A color rendition index (CRI) of at least about 70 is preferably attained by at least some of the luminaires using the optical members disclosed herein, with a CRI of at least about 80 being more preferable. Any desired particular output light distribution, could be achieved.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments, the distribution and direction of light within the optical member is better known, and hence, light is controlled and extracted in a more controlled fashion.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

I claim:

1. An optical member comprised of:
   a. a first refractive portion;
   b. a first total internal reflection surface adjacent to and disposed about at least a portion of the first refractive portion;
   c. a second total internal reflection surface displaced from the first total internal reflection surface distal to the first refractive portion and disposed about at least a portion of the first total internal reflection surface;
   d. a light exit surface opposite the first refractive portion, the first total internal reflection surface, and the second total internal reflection surface; and
   e. a second refractive portion disposed adjacent the first total internal reflection surface wherein a first end of the first total internal reflection surface abuts the first refractive portion, a second end of the first total internal reflection surface abuts the second refractive portion, and the second refractive portion abuts the second total internal reflection surface.

2. The optical member of claim 1 further comprising:
   a. a base attached to the optical member;
   b. a light source adjacent to the base; and
   c. a light exit surface opposite the base.

3. The optical member of claim 2, wherein the second total internal reflection surface is adjacent to and disposed about at least a portion of the base.

4. The optical member of claim 2, wherein the light exit surface is textured.

5. The optical member of claim 1, wherein the refractive portion comprises a convex surface.

6. The optical member of claim 2, wherein the light source is a light emitting diode (LED).

7. The optical member of claim 6, wherein the light source is a multi-die LED package.

8. The optical member of claim 2, wherein the second total internal reflection surface terminates proximal to the light exit surface.

9. The optical member of claim 8, further comprising a flange disposed about the base and defining at least two mounting openings.

10. The optical member of claim 2, wherein the refractive portion collimates light rays emitted from the light source within approximately ±20° from a central axis perpendicular to a the base.

11. The optical member of claim 2, wherein the first total internal reflection surface collimates light rays emitted from the light source between ±20° to ±45° of the central axis.

12. The optical member of claim 2, wherein the second total internal reflection surface collimates light rays emitted from the light source between ±45° to ±90° of the central axis.

13. The optical member of claim 2, wherein the light rays are collimated to approximately ±7.5° of a line parallel to the central axis.

14. The optical member of claim 1, wherein the optical member is comprised of a material consisting of one or more of acrylic, air, polycarbonate, molded silicone, glass, and/or cyclic olefin copolymers.

15. An optic for transmitting light from a light source, the optic comprised of:
   a. a base;
   b. a light source adjacent to the base;
   c. a refractive portion displaced a distance from the base;
   d. a first total internal reflection surface displaced from and angled away from the refractive portion;
   e. a second total internal reflection surface adjacent to and angled away from the base;
   f. a light exit surface disposed on a first side of the optic wherein the refractive portion and the first and second total internal reflection surfaces are disposed on a second side of the optic; and
   g. an outer surface disposed about both the first and second total internal reflection surfaces wherein the outer surface is disposed contiguous with and orthogonal to the light exit surface.

16. The optic of claim 15 further comprising a light exit surface opposite the base.

17. The optic of claim 15, wherein the light exit surface is textured.

18. The optic of claim 15, wherein the refractive portion comprises a convex surface.

19. The optic of claim 15, wherein the light source is a LED.

20. The optic of claim 15, wherein the light source is a multi-die LED package.

* * * * *